(12) United States Patent
Boduch et al.

(10) Patent No.: US 9,160,686 B2
(45) Date of Patent: Oct. 13, 2015

(54) METHOD AND APPARATUS FOR INCREASING OVERALL AGGREGATE CAPACITY OF A NETWORK

(75) Inventors: Mark E. Boduch, Geneva, IL (US); Jonathan B. Sadler, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 731 days.

(21) Appl. No.: 12/906,670

(22) Filed: Oct. 18, 2010

(65) Prior Publication Data
US 2011/0262135 A1   Oct. 27, 2011

Related U.S. Application Data

(60) Provisional application No. 61/252,717, filed on Oct. 18, 2009.

(51) Int. Cl.
| | |
|---|---|
| H04B 7/212 | (2006.01) |
| H04J 1/00 | (2006.01) |
| H04L 12/50 | (2006.01) |
| H04L 12/28 | (2006.01) |
| H04L 12/931 | (2013.01) |

(Continued)

(52) U.S. Cl.
CPC ............ *H04L 49/45* (2013.01); *H04L 49/1523* (2013.01); *H04B 7/2125* (2013.01); *H04L 41/069* (2013.01); *H04L 45/28* (2013.01)

(58) Field of Classification Search
CPC ......... H04L 49/10; H04L 49/15; H04L 45/28; H04L 41/069; H04B 7/2125; H04B 7/2621
USPC .......................................................... 370/386
See application file for complete search history.

(56) References Cited

U.S. PATENT DOCUMENTS 5,495,476 A * 2/1996 Kumar ........................ 370/388
6,229,822 B1 * 5/2001 Chow et al. .................... 370/474

(Continued)

OTHER PUBLICATIONS

Notification of Transmittal of the International Search Report and the Written Opinion of the International Searching Authority, or the Declaration for PCT/US2010/053036. Date Mailed: Apr. 5, 2011.

(Continued)

*Primary Examiner* — Faruk Hamza
*Assistant Examiner* — Abu-Sayeed Haque
(74) *Attorney, Agent, or Firm* — Hamilton, Brook, Smith & Reynolds, P.C.

(57) ABSTRACT

Example embodiments of the present invention relate to increasing an aggregate capacity of a network without using a centralized switch fabric. A method and corresponding apparatus in an example embodiment of the present invention relates to increasing overall aggregate capacity of a switching system. The example embodiment includes a first switching shelf having a first predetermined aggregate capacity, and multiple second switching shelves having a second predetermined aggregate capacity. The second predetermined aggregate capacity is less than the first predetermined aggregate capacity. The example embodiment increases the overall aggregate capacity as a function of connections between the first switching shelf and the multiple second switching shelves. The shelves are interconnected with interconnection links and can be configured to connect to additional shelves as the switching system grows to larger sizes. Embodiments can increase capacity while reducing cost within a network node.

23 Claims, 13 Drawing Sheets

(51) Int. Cl.
*H04L 12/933* (2013.01)
*H04L 12/703* (2013.01)
*H04L 12/24* (2006.01)

(56) References Cited

U.S. PATENT DOCUMENTS

| | | | |
|---|---|---|---|
| 7,110,394 B1 | 9/2006 | Chamdani et al. | |
| 7,277,425 B1 | 10/2007 | Sikdar | |
| 7,809,015 B1* | 10/2010 | Willis et al. | 370/466 |
| 2004/0264448 A1* | 12/2004 | Wise et al. | 370/386 |
| 2008/0068985 A1* | 3/2008 | Mieno | 370/217 |
| 2009/0003327 A1 | 1/2009 | Zang et al. | |
| 2009/0175281 A1* | 7/2009 | Higuchi et al. | 370/401 |

OTHER PUBLICATIONS

Hirano et al., "A Scalable Switch Architecture for Ultra-Large IP and Lambda Switch Routers", *Proceedings of the 10th Annual IEEE International Conference on Telecommunications*, Piscataway, NJ (2003).

Kang et al., "Switch Expansion Architecture Using Local Switching Network", *Proceedings of the IEEE International Conference on Communications*, New Orleans, LA (2000).

Notification Concerning Transmittal of International Preliminary Report on Patentability for PCT/US2010/053036. Date Mailed: May 3, 2012.

\* cited by examiner

300

| Controller Card 1 380-1 | |
|---|---|
| Port Card 1 310-1 | |
| Port Card 2 310-2 | |
| Port Card 3 310-3 | |
| Port Card 4 310-4 | |
| Port Card 5 310-5 | |
| Port Card 6 310-6 | |
| Switch Card 5 350-5 | Switch Card 1 350-1 |
| Switch Card 6 350-6 | Switch Card 2 350-2 |
| Switch Card 7 350-7 | Switch Card 3 350-3 |
| Switch Card 8 350-8 | Switch Card 4 350-4 |
| Port Card 7 310-7 | |
| Port Card 8 310-8 | |
| Port Card 9 310-9 | |
| Port Card 10 310-10 | |
| Controller Card 2 380-2 | |

FIG. 3A

| 800 | |
|---|---|
| Controller Card Slot 1  880-1 | Controller Card Slot 3  880-3 |
| Port Card Slot 1  810-1 | Port Card Slot 11  810-11 |
| Port Card Slot 2  810-2 | Port Card Slot 12  810-12 |
| Port Card Slot 3  810-3 | Port Card Slot 13  810-13 |
| Port Card Slot 4  810-4 | Port Card Slot 14  810-14 |
| Port Card Slot 5  810-5 | Port Card Slot 15  810-15 |
| Port Card Slot 6  810-6 | Port Card Slot 16  810-16 |
| Switch Card Slot 1  850-1 | Switch Card Slot 5  850-5 |
| Switch Card Slot 2  850-2 | Switch Card Slot 6  850-6 |
| Switch Card Slot 3  850-3 | Switch Card Slot 7  850-7 |
| Switch Card Slot 4  850-4 | Switch Card Slot 8  850-8 |
| Port Card Slot 7  810-7 | Port Card Slot 17  810-17 |
| Port Card Slot 8  810-8 | Port Card Slot 18  810-18 |
| Port Card Slot 9  810-9 | Port Card Slot 19  810-19 |
| Port Card Slot 10  810-10 | Port Card Slot 20  810-20 |
| Controller Card Slot 2  880-2 | Controller Card Slot 4  880-4 |

FIG. 8A

METHOD AND APPARATUS FOR INCREASING OVERALL AGGREGATE CAPACITY OF A NETWORK

RELATED APPLICATION

This application claims the benefit of U.S. Provisional Application No. 61/252,717, filed on Oct. 18, 2009, the entire teachings of which are incorporated herein by reference.

BACKGROUND

Due to the continued increase in the required speed and memory capacity of processors, such as personal computers, workstations, and servers, current communications systems are challenged to deliver data to these processors at continually higher speeds.

Typical communications systems include collections of interconnected access nodes that communicate with one another using a software protocol structure. These nodes may be interconnected using one or more network switches included in a switch fabric.

SUMMARY

A method and corresponding apparatus in an example embodiment of the present invention relates to increasing overall aggregate capacity of a switching system. The example embodiment includes a first switching shelf having a first predetermined aggregate capacity, and multiple second switching shelves having a second predetermined aggregate capacity. The second predetermined aggregate capacity is less than the first predetermined aggregate capacity. The example embodiment increases the overall aggregate capacity as a function of connecting the first switching shelf to the multiple second switching shelves.

Another example embodiment of the present invention relates to a method and corresponding apparatus for upgrading a switching system by interconnecting a first switching shelf to multiple second switching shelves via a plurality of interconnection links. The first switching shelf includes a plurality of interconnected port cards having a first predetermined aggregate capacity for carrying data forwarded to the switching system and a plurality of switch cards having a second predetermined aggregate capacity for switching the data carried by the interconnected port cards. The second predetermined aggregate capacity is arranged to be greater than the first predetermined aggregate capacity. Each second switching shelf includes a plurality of interconnected port cards having a third predetermined aggregate capacity for carrying data forwarded to the switching system and a plurality of switch cards having a fourth predetermined aggregate capacity for switching the data carried by the interconnected port cards. The fourth predetermined aggregate capacity is greater than the third predetermined aggregate capacity, the third predetermined aggregate capacity is less than the first predetermined aggregate capacity, and the fourth predetermined aggregate capacity is less than the second predetermined aggregate capacity. The example embodiment upgrades the switching system as a function of the interconnection links connecting the switch cards of the multiple second switching shelves to the switch cards of the first switching shelf.

Yet another example embodiment of the present invention relates to a switching system and corresponding switching method. The switching system includes a first switching shelf and a plurality of second switching shelves. The first switching shelf includes a first predetermined aggregate capacity. The plurality of second switching shelves include a second predetermined aggregate capacity. The second predetermined aggregate capacity is less than the first predetermined aggregate capacity, and each second switching shelf is connected to the first switching shelf as a function of one or more bidirectional links. Each second switching shelf includes one or more unpopulated connectors.

Another example embodiment of the present invention relates to a switching system and corresponding switching method. The switching system includes a plurality of port cards and one or more switch cards. The plurality of port cards have a first predetermined aggregate capacity. The one or more switch cards have a second predetermined aggregate capacity. The second predetermined aggregate capacity is different from the first predetermined aggregate capacity. Each switch card is connected to the plurality of port cards as a function of one or more bidirectional links. The switch cards have different aggregate capacities for connecting the switching system to one or more networks having various aggregate capacities.

Another example embodiment of the present invention relates to a switching system and corresponding switching method. The system includes first switching shelf and multiple second switching shelves. The first switching shelf includes a plurality of interconnected port cards that have a first predetermined aggregate capacity for carrying data forwarded to the switching system and a plurality of switch cards that have a second predetermined aggregate capacity for switching the data carried by the interconnected port cards. The second predetermined aggregate capacity is greater than the first predetermined aggregate capacity. Each second switching shelf includes a plurality of interconnected port cards that have a third predetermined aggregate capacity for carrying data forwarded to the switching system and a plurality of switch cards that have a fourth predetermined aggregate capacity for switching the data carried by the interconnected port cards. The fourth predetermined aggregate capacity is greater than the third predetermined aggregate capacity. The third predetermined aggregate capacity is less than the first predetermined aggregate capacity, and the fourth predetermined aggregate capacity is less than the second predetermined aggregate capacity. Each second switching shelf is connected to the first switching shelf as a function of a plurality of interconnecting links, and each second switching shelf has one or more unpopulated connections.

Yet another example embodiment of the present invention relates to a switching system and corresponding switching method. The switching system includes a first switching shelf having a first predetermined aggregate capacity and multiple second switching shelves having a second predetermined aggregate capacity. The first predetermined aggregate capacity is greater than the second predetermined aggregate capacity. The multiple second switching shelves are connected to the first switching shelf via respective connection ports and of a plurality of interconnection links. The multiple second switching shelves include a number of connection ports unconnected to the connection ports of the first switching shelf.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale.

FIG. 3A is an example embodiment of a layout of a switching shelf;

FIG. 8A illustrates a physical slot layout of a port switching shelf according to example embodiments of the present invention;

DETAILED DESCRIPTION

A description of example embodiments of the invention follows.

Figure 1:
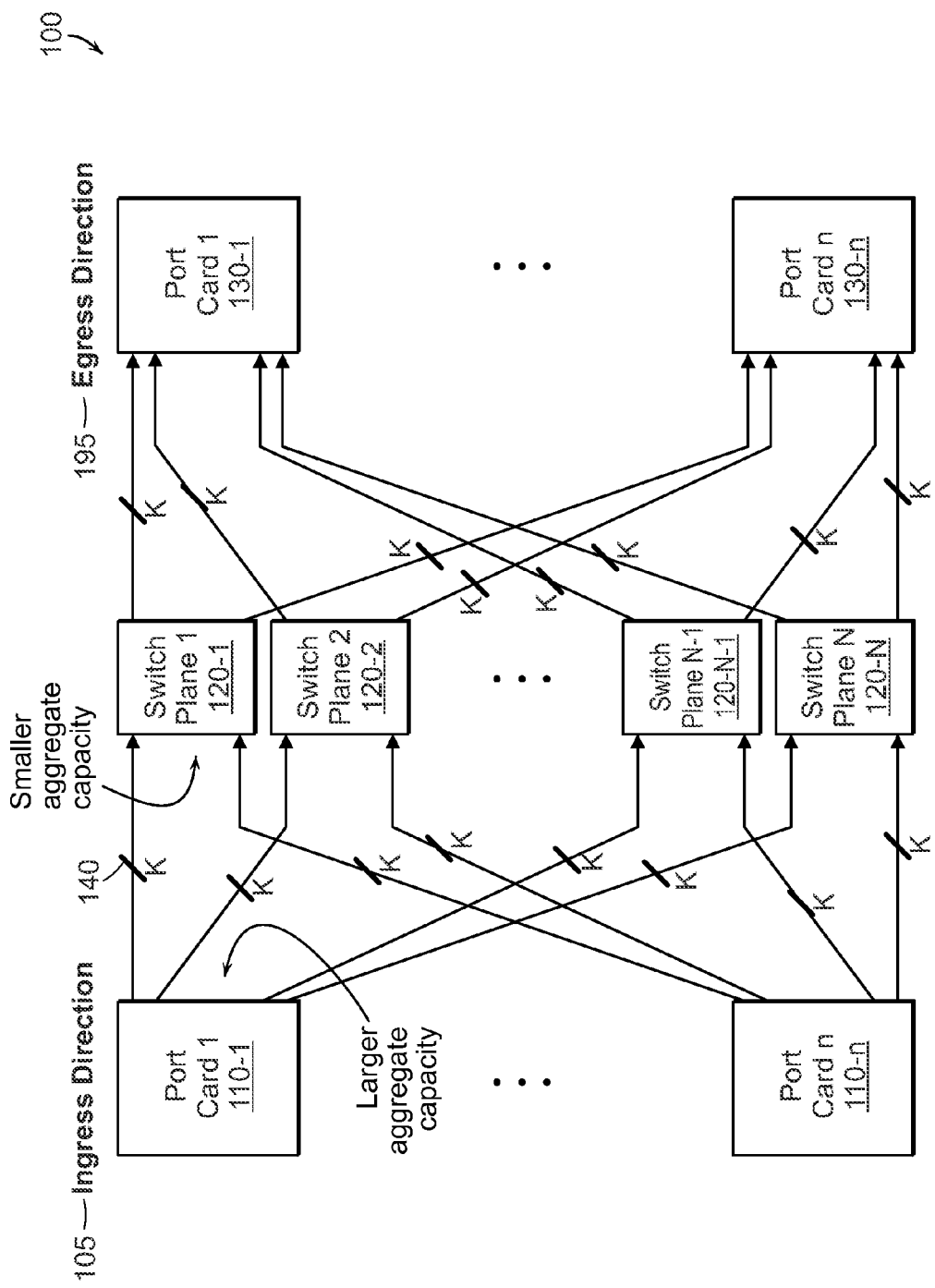
FIG. 1 is an illustration of a switching system.

FIG. 1 is an illustration of a switching system 100. A switching system 100 may include a plurality of port card slots 110-1, ..., 110-$n$ positioned in an ingress direction 105 as well as corresponding port card slots 130-1, ..., 130-$n$ positioned in an egress direction 195. The port cards 110-1, ..., 110-$n$, 130-1, ..., 130-$n$ may be interconnected via a plurality of switch planes 120-1, 120-2, ..., 120-N−1, 120-N. Although, the port cards 110-1, ..., 110-$n$, 130-1, ..., 130-$n$ illustrated in FIG. 1 are shown as being divided into ingress 105 and egress 195 port cards, the same port card used in the ingress direction 105 may be used in the egress direction 195. Therefore, the port cards 110-1 and 130-1 may physically be the same card containing both an ingress direction function and an egress direction function.

The switching system 100 may include one or more shelves (not shown). For example, some small switching systems may include a single shelf. Each shelf includes a plurality of port cards 110-1, ..., 110-$n$, 130-1, ..., 130-$n$. The port cards 110-1, ..., 110-$n$, 130-1, ..., 130-$n$ may be interconnected with a backplane (not shown) that includes a large printed circuit board (PCB).

Switch planes 120-1, 120-2, ..., 120-N−1, 120-N reside within the one or more shelves and are used to partition the switching system 100. Specifically, each switching plane 120-1, 120-2, ..., 120-N−1, 120-N switches a portion of a payload associated with each port card 110-1, ..., 110-$n$, 130-1, ..., 130-$n$. For example, each switch plane 120-1, 120-2, ..., 120-N−1, 120-N may switch at the bit level, at the byte level, at the cell level, or at the packet level. In certain embodiments, a given port card may distribute its associated payload equally over the multiple switch planes 120-1, 120-2, ..., 120-N−1, 120-N.

In the example shown in FIG. 1, each ingress port card 110-1, ..., 110-$n$ corresponds to n different paths to which it can forward its data. Each switch plane 120-1, 120-2, ..., 120-N−1, 120-N receives k numbers of links of data 140 from each of the port cards 110-1, ..., 110-$n$ in the ingress direction 105. The switch planes 120-1, 120-2, ..., 120-N−1, 120-N forward the data to appropriate egress port cards 130-1, ..., 130-$n$. In this example, each switch plane 120-1, 120-2, ..., 120-N−1, 120-N is said to perform a switching of kn×kn link function.

Figure 2:
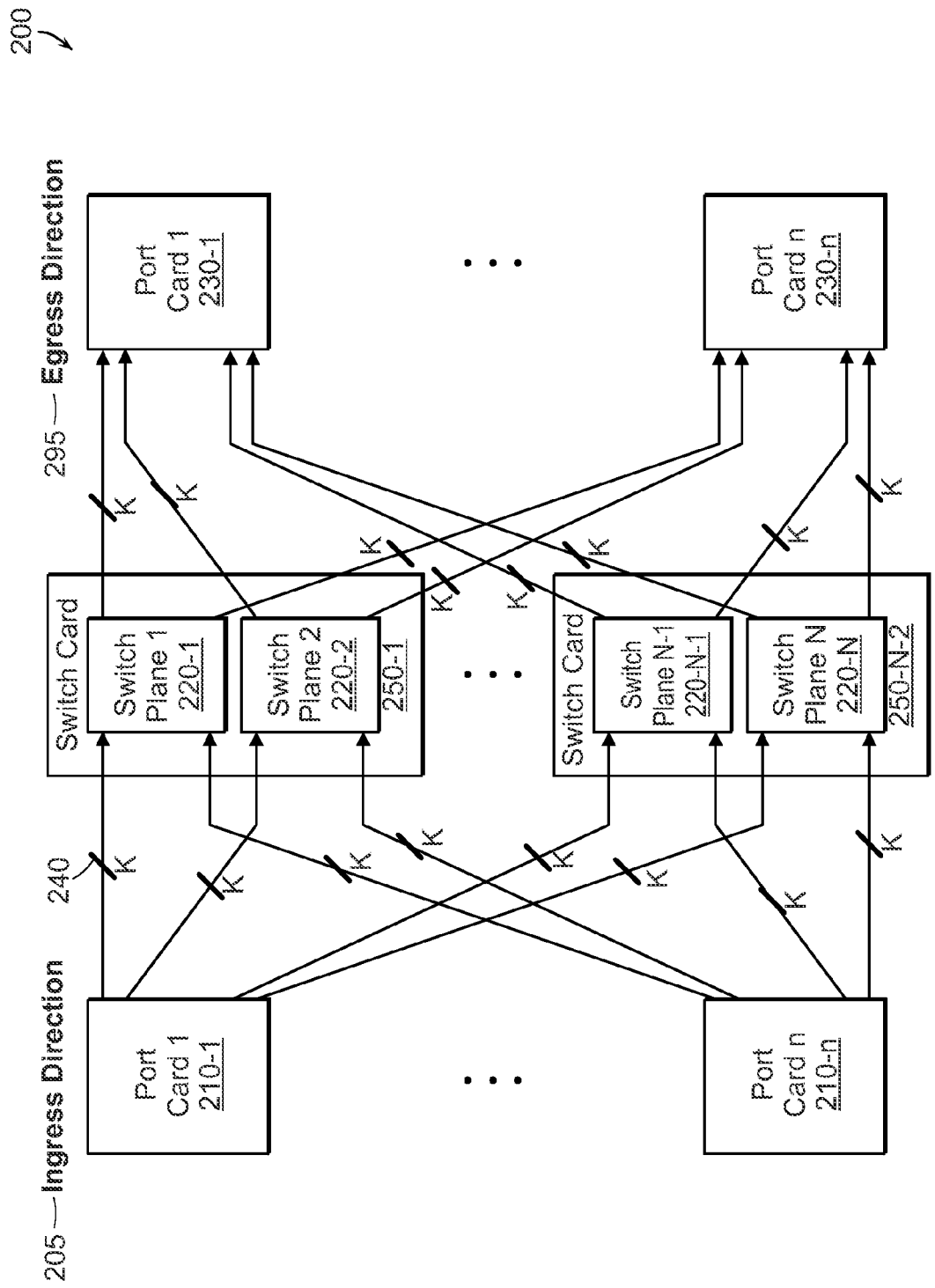
FIG. 2 is an example embodiment of a switching system that includes switch planes allocated to corresponding switch cards.

FIG. 2 is an example embodiment of a switching system 200 that includes switch planes 220-1, 220-2, ..., 220-N−1, 220-N allocated to corresponding switch cards 250-1, ..., $$250-1, \ldots, 250-\frac{N}{2}.$$

In this switching system, the switch planes 220-1, 220-2, ..., 220-N−1, 220-N have been allocated to $$\frac{N}{2}$$

corresponding switch cards. Each ingress port card 210-1, ..., 210-$n$ corresponds to n different paths to which it can forward its data. The switch cards 250-1, ..., $$250-1, \ldots, 250-\frac{N}{2}$$

receive and forward the data 240 to appropriate egress port cards 230-1, ..., 230-$n$.

In the view of the foregoing, the following description illustrates example embodiments and features that may be incorporated into a system for increasing aggregate capacity of a switching system, where the term "system" may be interpreted as a system, subsystem, device, apparatus, method, or any combination thereof.

Each switching shelf may include one or more port cards for carrying data forwarded to the switching system. The system may further include one or more switching planes connected to the one or more port cards, where a switching plane is a logical construct, as understood in the art, corresponding to physical components performing the actual switching, where the physical components are not necessarily in a plane relative to each other. The switching planes switch the data carried by the one or more port cards. The system may further include one or more switch cards. Each switch card may include at least one switching plane.

The system may further include a redundant switching plane. The redundant switching plane may serve as a protection switching plane for the one or more switching planes. The redundant switching plane may switch the data carried by the one or more ports in an event a switching plane of the one or more switching planes fails.

FIG. 3A is an example embodiment of a physical layout of a switching shelf 300. In this example embodiment, the switching shelf 300 contains ten full-height port cards 310-1, ..., 310-10, eight half-height switch cards 350-1, ..., 350-8, and two full-height controller cards 380-1, 380-2. The switch cards 350-1, ..., 350-8 are off-center with respect to the shelf 300 so that the shelf 300 can accommodate a maximum number of double-wide port cards. For example, in certain embodiments, the shelf 300 may include three double-wide port cards to the left of the switch cards, and two double-wide port cards to the right of the switch cards.

Although the switching shelf 300 is shown with ten port cards 310-1, ..., 310-10 and eight switch cards 350-1, ..., 350-8, a switching shelf 300 may include various numbers of port and switch cards. For example, a switching shelf may include twelve, fourteen, sixteen, or other numbers of port cards, and two, three, four, five, six, or seven switch cards. Other numbers of port and switch cards may also be employed.

Figure 3B:
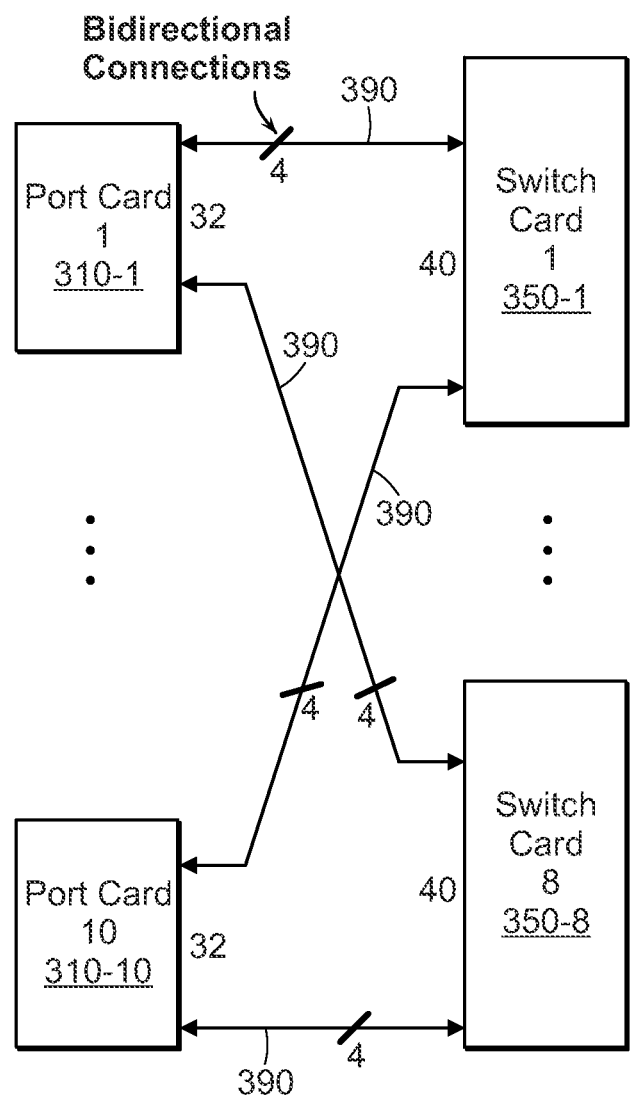
FIG. 3B illustrates the interconnections of the cards shown in FIG. 3A.

FIG. 3B illustrates the interconnections of the cards shown in FIG. 3A with the backplane PCB. Although the controller cards 380-1, 380-2 (shown in FIG. 3A) and the switch cards 350-1, ..., 350-8 are connected, these connections are not shown in FIG. 3B.

Each port card 310-1, ..., 310-10 is arranged to connect to each of the switch cards 350-1, ..., 350-8 using four bidirectional connections 390. Each bidirectional connection may be implemented using four PCB traces (i.e., two differential pairs in each direction).

In certain embodiments, each bidirectional connection 390 can transfer data at the rate of 6.25 Giga bits per seconds (Gbps). From the 6.25 Gbps of data rate, 2.25 Gbps may be dedicated to connection overhead information and 4 Gbps may be dedicated to payload data received from the line and/or client interfaces of the port cards 310-1, ..., 310-10.

Client and line interfaces on the port cards 310-1, ..., 310-10 may be mounted on the front panels of the port cards 310-1, ..., 310-10. These interfaces may be in the form of pluggable optical devices. Examples of such pluggable devices include Small Form Factor Pluggable (SFP), 10 Gbps Small Form Factor Pluggable (XFP), and 100 Gbps Form Factor pluggable (CFP).

In certain embodiments, the client and line interfaces may be in the form of simple optical connectors that connect to optical devices internal to the port cards 310-1, ..., 310-10.

In the example embodiment shown in FIG. 3B, each port card 310-1, ..., 310-10 has thirty two links connecting the port card to the backplane resulting in a total of 128 Gbps of payload data that can be transferred from each port card 310-1, ..., 310-10 to the eight switch card 350-1, ..., 350-8.

In certain embodiments, one of the switch cards 350-1, ..., 350-8 in the shelf 300 may be a redundant switch card for the remaining switch cards 350-1, ..., 350-8 in the shelf 300. For example, one switch card may serve as a protection switch card to the other remaining switch cards. In an event one of the switch cards 350-1, ..., 350-8 fails, the remaining switch cards are arranged to be capable of transporting the entire payload of the port cards. The example embodiment employs the switch card serving as a protection switch card and modifies the usable payload bandwidth per switch card, accordingly. For example, in the embodiment shown in FIG. 3B, the system may modify the bandwidth per switch card to ⅞×128=112 Gbps per switch card.

Figure 4:
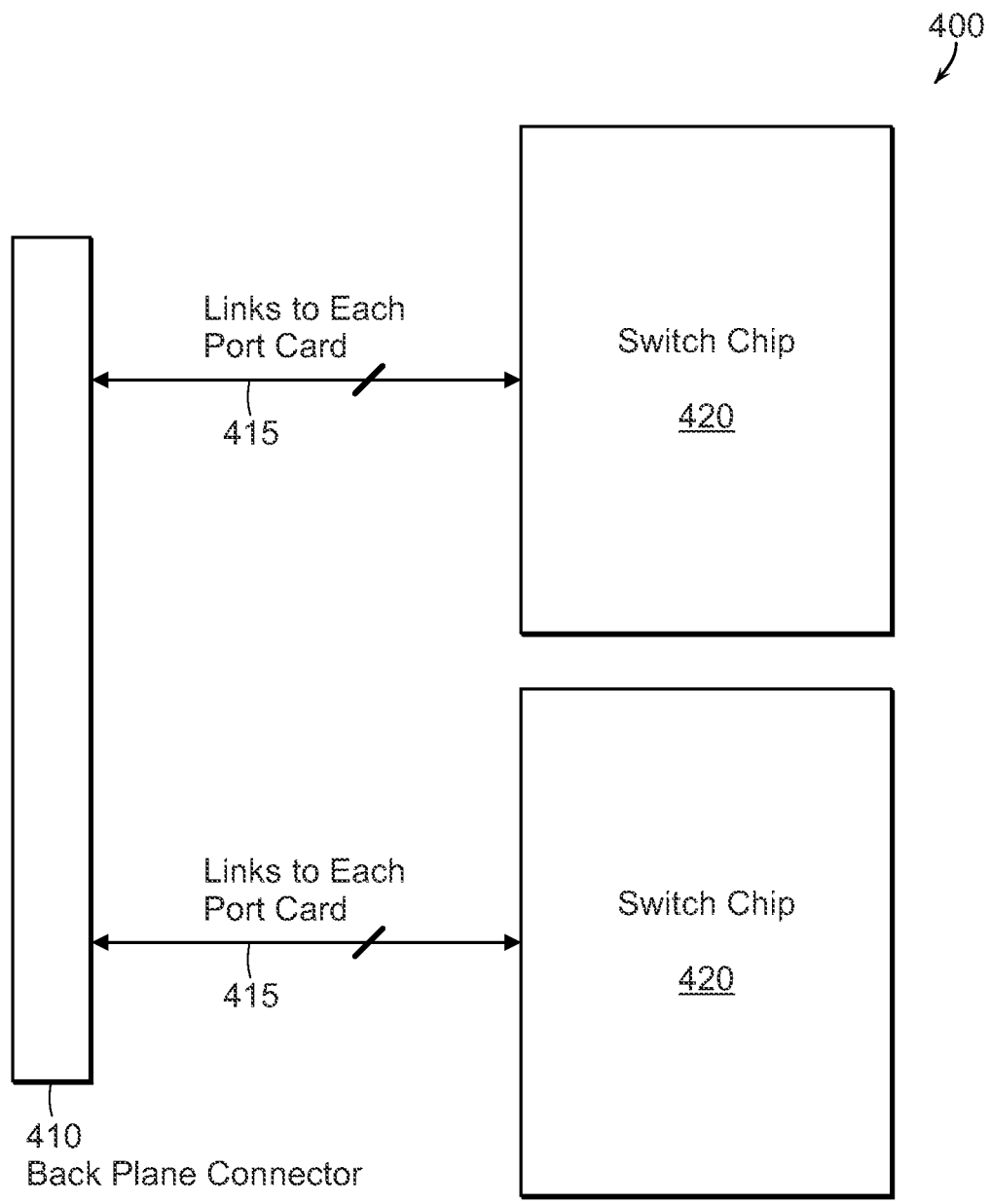
FIG. 4 is a block diagram of a switch card.

FIG. 4 is a block diagram 400 of a switch card 250-1, ..., $$250-1, \ldots, 250-\frac{N}{2}$$

(shown in FIGS. 3A-3B) according to example embodiments of the present invention. The switch card can support various payload bandwidths. For example, in some embodiments, the switch card can support port cards with payload bandwidths up to 112 Gbps for a standalone shelf switching application. The card contains two 20×20 switch chips 420, with each switch chip 420 performing the switching function of one switching plane. The switch chips 420 connect to a backplane connector 410 and via links 415 that connect each switch chip to corresponding port cards (shown in FIGS. 2, 3A-3B).

Figure 5:
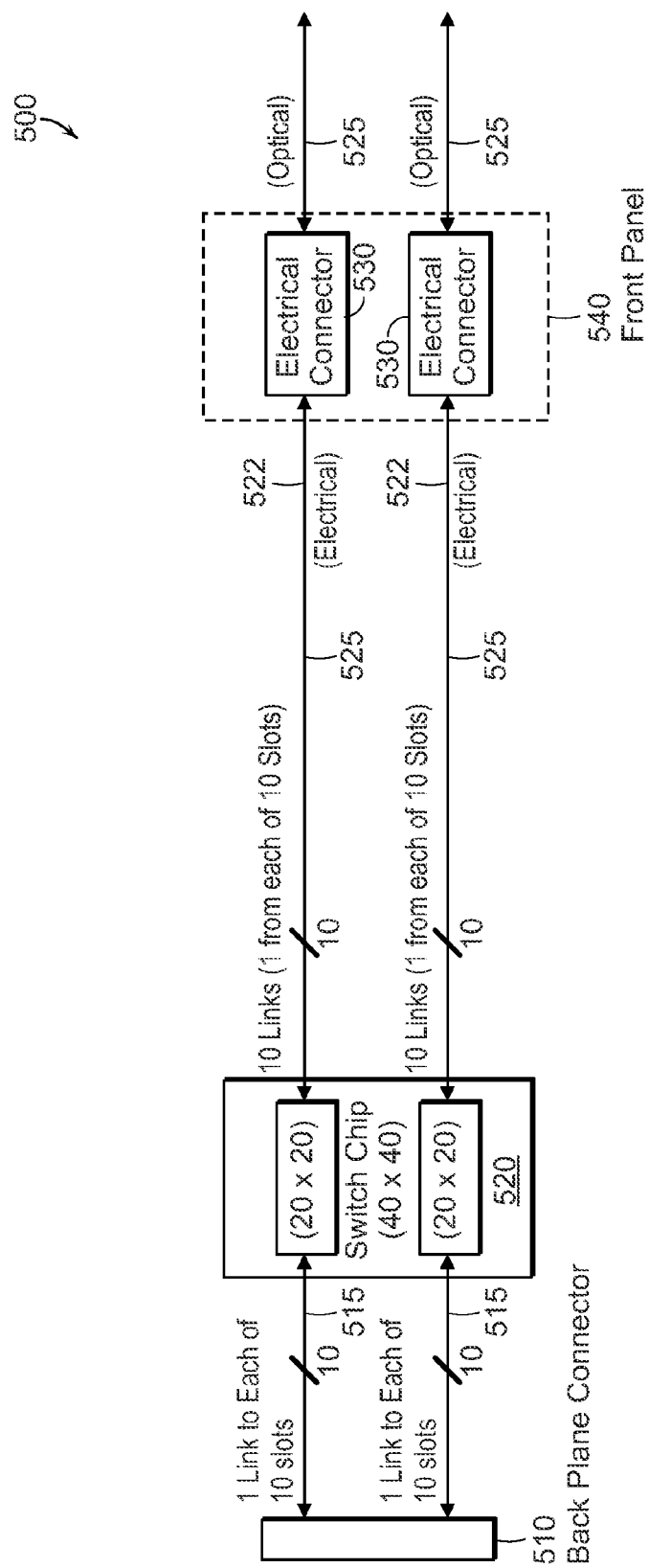
FIG. 5 is a block diagram of a switch card that may be used with the switching shelf shown in FIG. 3A.

FIG. 5 is a block diagram of a switch card 500 that may be used with the switching shelf shown in FIG. 3A. The switch card 500 in this embodiment is a half-height single-capacity switch card. The switch card 500 can support port cards with unprotected payload bandwidths up to 64 Gbps (assuming each link transports 4 Gbps for either a standalone shelf switching application or an expandable shelf switching application).

In the example embodiment shown in FIG. 5, the switch card includes two 20×20 switch chips. However, only half of the links 515 of each switch chip 520 are run to the backplane connector 510 (i.e., two links per each port card (not shown) in the backplane connector 510). The remaining half of the links 525 are run to two electrical connectors 530 that are mounted on the front panel 540 of each switch card.

The front panel electrical connector 540 can accommodate a cable pluggable into the front panel. For example, a C-Wire cable (e.g., C-Wire cable manufactured by Finisar Inc.) may be used. The pluggable cable may use optics built into the cable assembly on each end the cable.

In certain example embodiments, each cable includes p optical-to-electrical converters and p electrical-to-optical converters at both ends. The converters connect to a total of 2p optical fibers. In certain embodiments, the optical fibers may connect the two ends of the cable within a ribbon cable assembly. There are no exposed optics associated within the cable as the fiber optics are all internal to the cable assembly, resulting in a simple electrical connector on each end of the cable. Each cable assembly may be designed to carry signals of up to d Gbps on each of its 2p fibers. A pair of cables may be plugged into the electrical connectors 530 with each cable carrying a number p of bidirectional links 525. For the case shown in FIG. 5, p is equal to 10, and d may be equal to 12.5. For the case of FIG. 5, if the system is initially designed such that each electrical and optical link transports 6.25 Gbps, and if the backplane and backplane connector 510 are designed to carry signals up to d Gbps in the future (for example, 12.5 Gbps), as technology becomes available, the shelf capacity can be increased (e.g., doubled), using the same shelf and same parallel optical cables. This assumes that new switch chips become available which are capable of operating on links at double the rate. Alternatively, the future links may operate at some value less than d Gbps, but at some value greater than d/2 Gbps.

Figure 6:
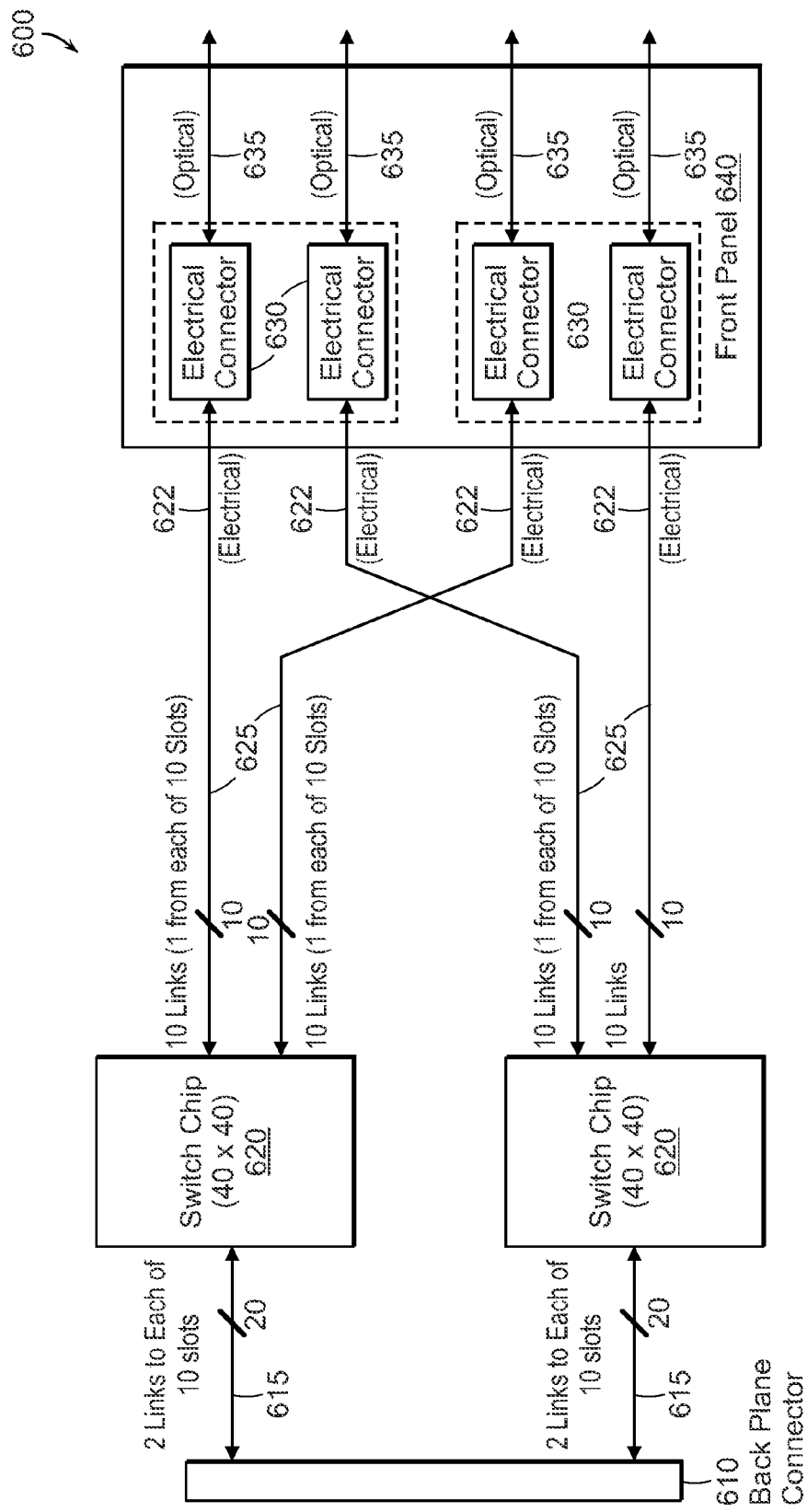
FIG. 6 is a block diagram of a switch card that may be used with the switching shelf shown in FIG. 3A.

FIG. 6 is a block diagram of a switch card 600 that may be used with the switching shelf shown in FIG. 3A. The switch card 600 may be referred to as a half-height double-capacity switch card. In this example embodiment, the switch card 600 may support port cards with various payload bandwidths (e.g., up to 112 Gbps) for either a standalone shelf switching application, or an expandable shelf switching application. In this example embodiment, the switch card 400 includes two 40×40 switch chips 620 and four electrical connectors 630 for pluggable front panel optics. Forty links 615 are sent to the backplane 610 (allowing for the thirty-two connections of all links of the ten port card slots over eight switch cards) and forty links are sent to the front panel pluggable optics 640. Each front panel electrical connector 635 may accommodate a cable that is pluggable into the front panel 640.

Figure 7A:
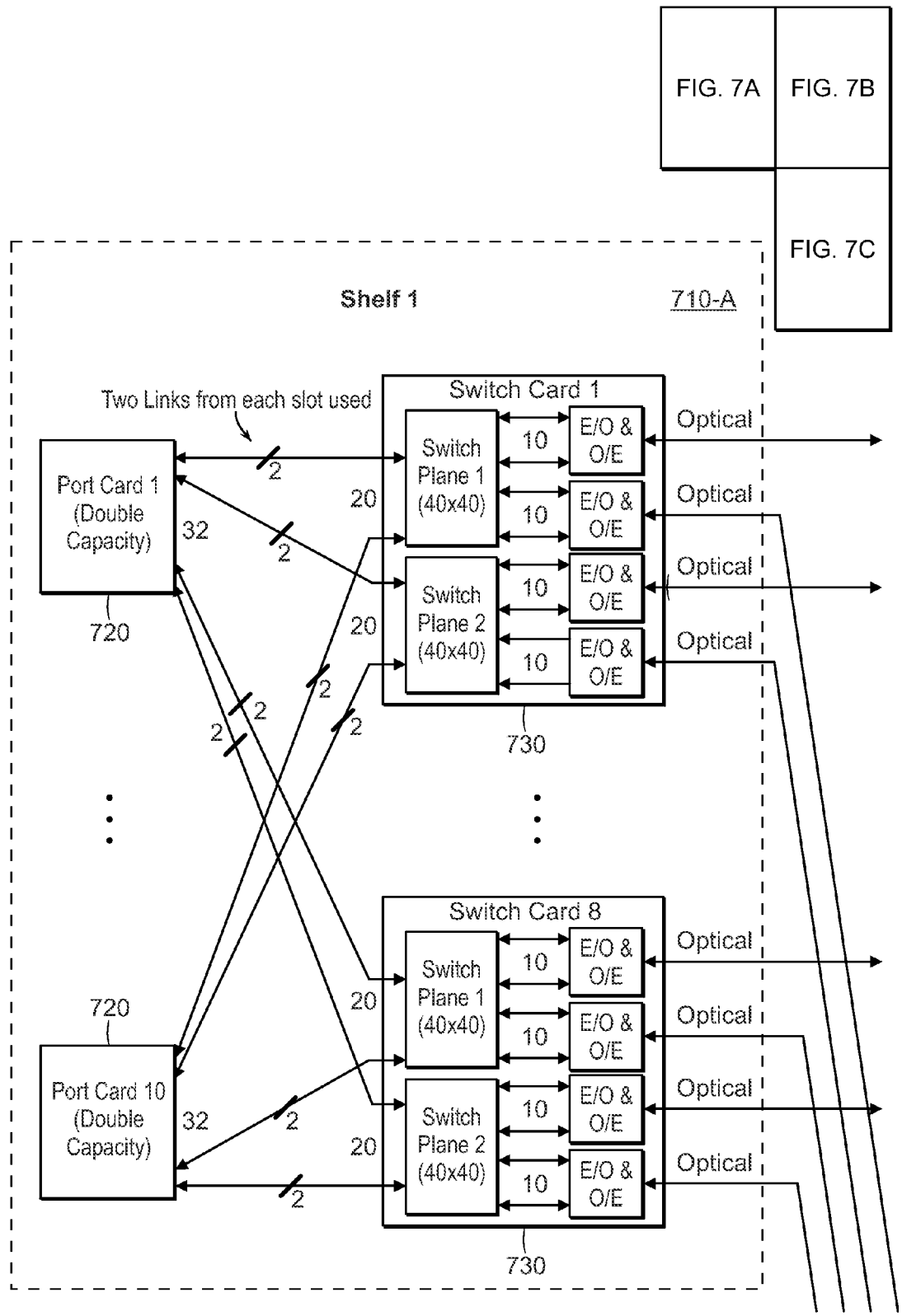
FIG. 7 illustrates interconnections of switching shelves according to an example embodiment of the present invention.
Figure 7B:
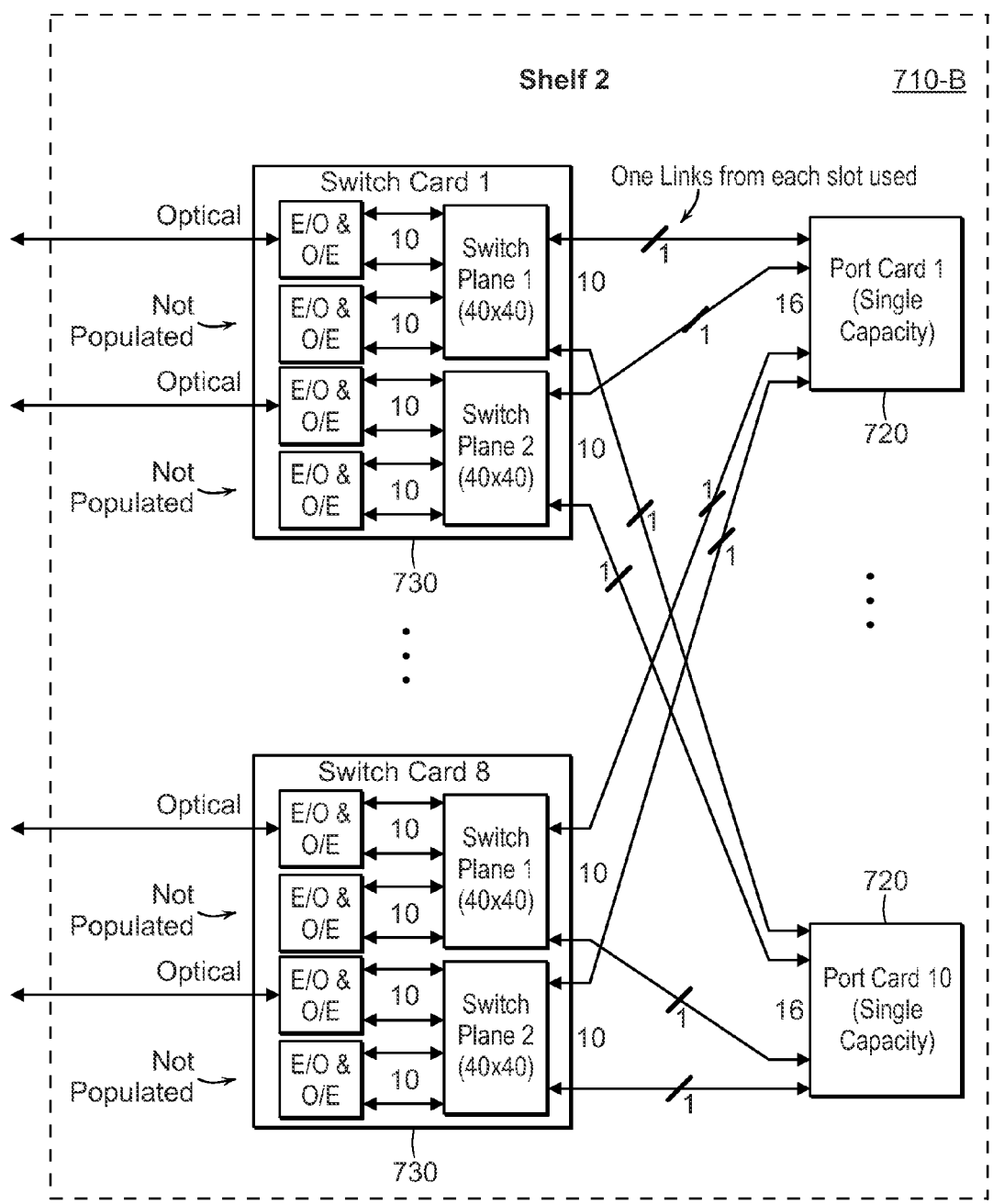
Figure 7C:
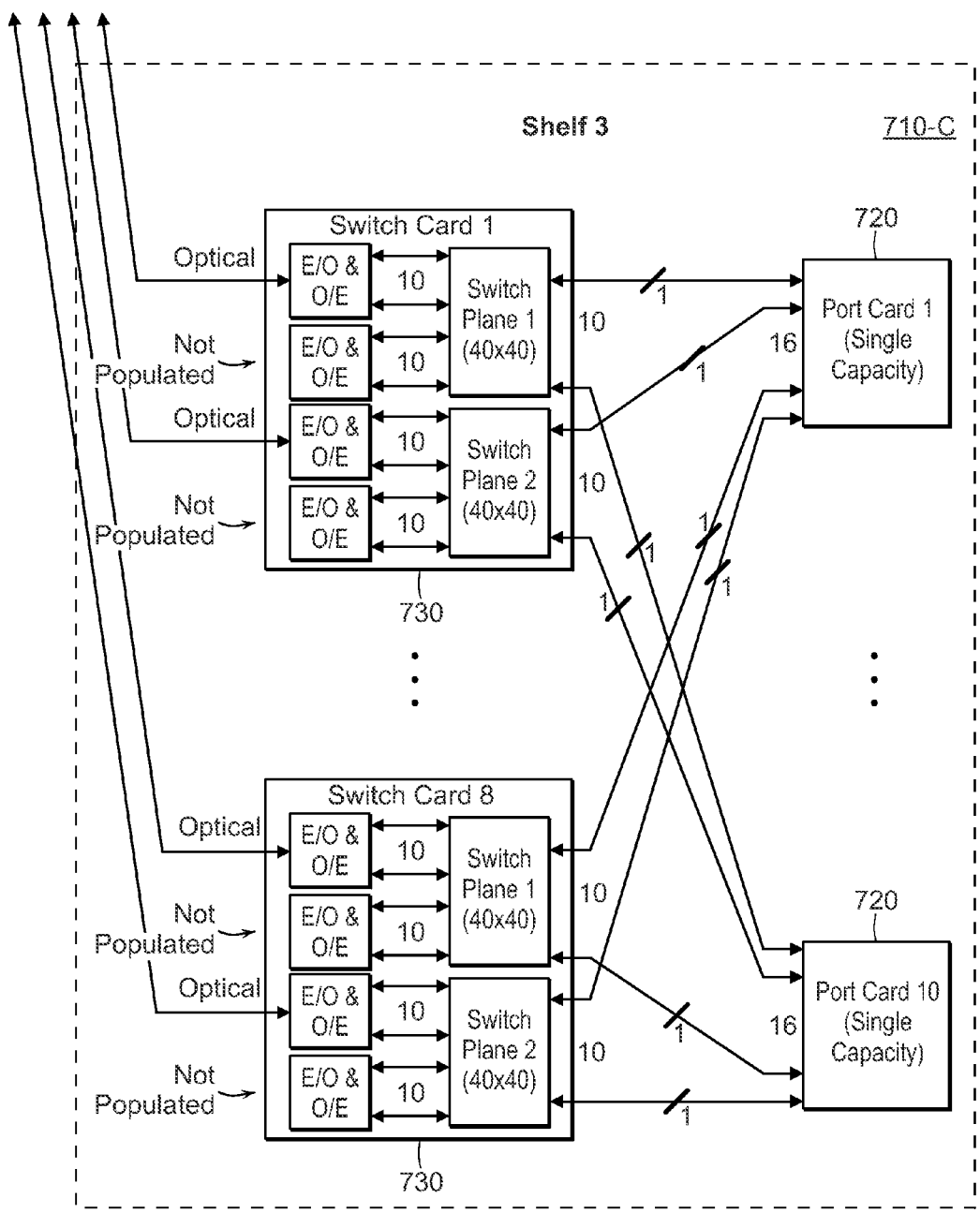

FIG. 7 illustrates interconnections of switching shelves according to an example embodiment of the present invention. The switching shelves 710-a, 710-b, 710-c may utilize single-capacity port cards in all three shelves (i.e., port cards with payload bandwidths no greater than 56 Gbps), and shelves 2 (710-b) and 3 (710-c) may use single-capacity switch cards 730, while shelve 1 (710-a) must use double-capacity switch cards. The switch cards 730 operate as described in relation to FIGS. 5-6. When using the single-capacity port cards in all the shelves of FIG. 7, each port card actually transmits all of its bandwidth to the eight switch cards using only 16 total links (2 to each switch card). For this case, only half of the 32 links available to each port card slot are utilized. The shelves 710-a, 710-b, 710-c are optically interconnected with thirty-two parallel optical cables (two per switch card on shelves 2 and 3, and four per switch card on shelf 1). For example, the switch card 1 of shelf 1 is directly connected to switch card 1 of shelf 2, etc. (as illustrated in FIG. 7). The switch cards in shelf 2 and shelf 3 do not necessarily need to perform any switching, as it is possible for the switch cards in shelf 1 to perform the switching for all three shelves. If this is done, switch cards in shelf 2 and shelf 3 may be placed in a pass-through mode, or replaced altogether with simple driver and receiver chips. It should be noted that double-capacity switch cards may also be used in shelves 2 and 3 (as is illustrated in FIG. 7). When using double-capacity switch cards in all three shelves, half of the front panel connectors (cages) used for the pluggable optics may not be used on each switch card in shelves 2 and 3 (as illustrated in FIG. 7). Since pluggable optics are being used, when using a double-capacity switch card in place of a single-capacity switch card, a single switch card incurs the cost of a single 40×40 switch chip.

In the embodiment of FIG. 7, if shelf 1 is only connected to a single second shelf (with both shelves only containing single-capacity port cards), then both shelves contain only single-capacity switching cards, or, alternatively, either one or both shelves contain double-capacity switch cards. (For the latter case, on any double-capacity switch cards (in either shelf), half the front panel electrical connectors (cages) would not be used.)

As illustrated in FIG. 7, shelf 1 may be populated with double-capacity port cards (i.e., port cards with payload bandwidths no greater than 112 Gbps). When shelf 1 is populated with double-capacity port cards and shelves 2 and 3 are populated with single-capacity port cards, all the switching resources on the eight switch cards in shelf 1 are utilized (i.e., each link of each 40×40 switch chip is used).

Finally, it is possible to attached shelf 1 (using double-capacity port cards and double-capacity switch cards) to a second shelf (using double-capacity port cards and double-capacity switch cards). For this case, each switch card in shelf 1 is directly connected to the corresponding switch card in the second shelf using, for example, four parallel cables (for a total of 32 parallel cables).

Therefore, either two or three shelves can be connected together to form a larger switching system without the need of a central switch fabric. For all configurations, double-capacity switch cards can be used, but in some configurations, single-capacity switching cards can be used.

When interconnecting three shelves together as shown in FIG. 7, with double-capacity port cards in shelf 1 and single-capacity port cards in shelves 2 and 3, "double-wide" double-capacity cards may be used in shelves 2 and 3. A double-wide card requires two slots within a given shelf. Therefore, up to five double-wide port cards (each supporting 112 Gbps of payload bandwidth) can be placed in both shelves 2 and 3. Alternatively, a mixture of both single-wide "single-capacity" port cards and "double-wide" double-capacity port cards can be placed in shelves 2 and 3.

Further, an initial system may contain a single shelf (shelf 1), which utilizes double-capacity switch cards. Such a shelf would initially require no parallel cables. For this case, the initial system does not incur the cost of the optical-to-electrical and electrical-to-optical converters needed on the switch cards in order to connect to a second shelf. Only when the second shelf is added to the system does the system incur the cost of the optical-to-electrical and electrical-to-optical converters needed on the switch cards in order to connect to a second shelf. If the second shelf added only contains "single-wide" single-capacity port cards and "double-wide" double-capacity port cards, only half the front panel connectors (cages) on each shelf need be populated by the expensive parallel cables containing the optical-to-electrical and electrical-to-optical converters. Then only when the third shelf is added to the system are the remaining optical-to-electrical and electrical-to-optical converters added to the cost of the system. Therefore, a "pay as you grow" strategy is utilized. It should be noted that although shelf 1 may utilize higher capacity port modules than shelves 2 and 3, all three shelves may be physically identical with respect to the backplane, metal work, and controller cards, thus allowing a customer to stock a single shelf type.

If the backplanes and connectors of the shelves are designed to operate with double rate links (i.e., 12.5 Gbps links), in the future, the same shelf may be upgraded to double its capacity by simply installing a switch card which has double the original capacity (a quadruple-capacity switch card). This allows the use of quadruple-capacity single-wide port cards within shelf 1 and double-capacity single-wide port cards in shelves 2 and 3. Therefore, double-wide port cards supporting 448 Gbps of payload data can be placed in shelf 1, and single-wide port cards supporting 112 Gbps of payload data can be placed in shelves 2 and 3.

Figure 8B:
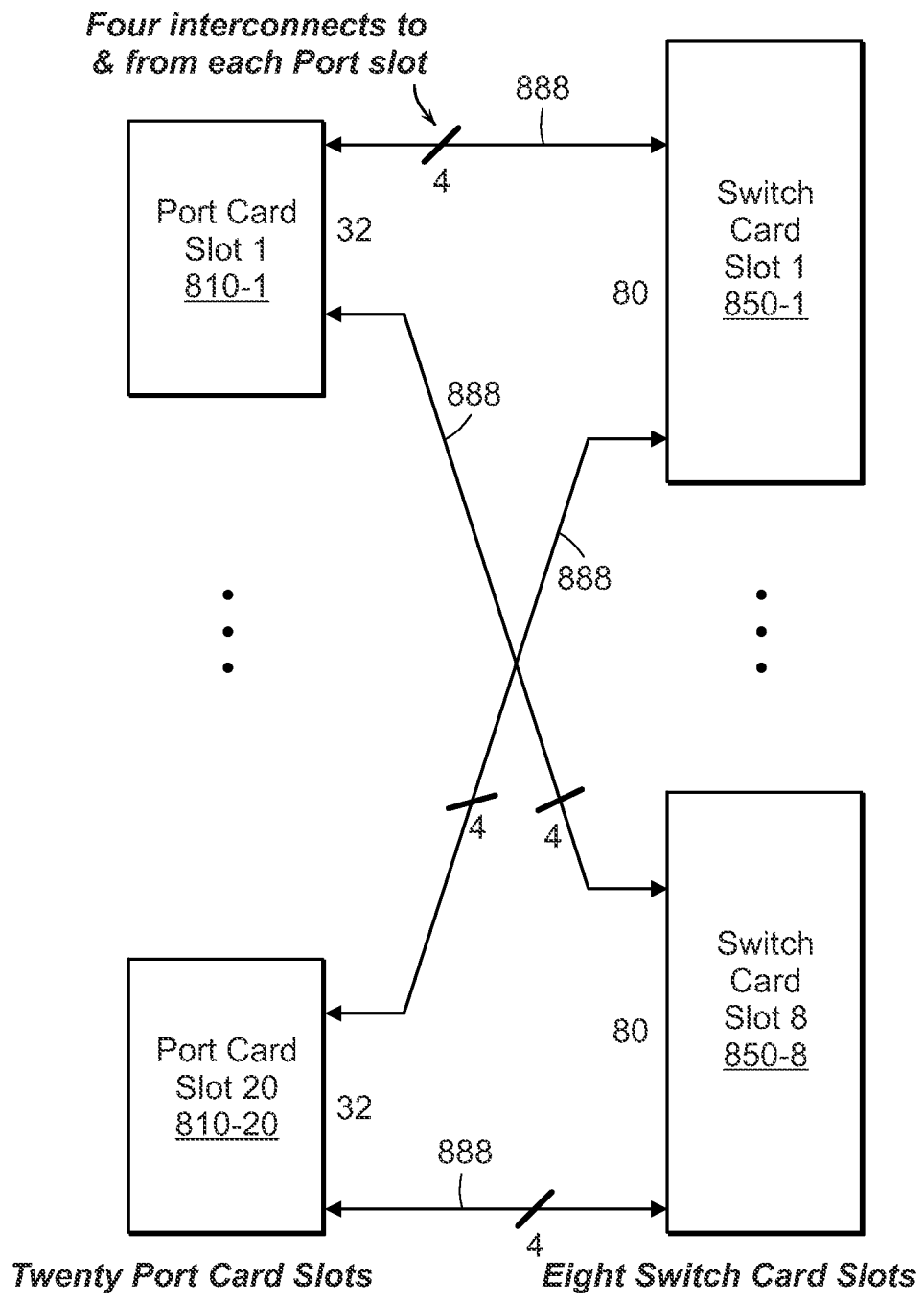
FIG. 8B illustrates the interconnections of the cards shown in FIG. 8A.

FIG. 8A illustrates a physical layout 800 of a port switching shelf 801 (shown in FIG. 8B) according to example embodiments of the present invention.

The switching shelf 800 contains twenty full-height port cards 810-1, . . . 810-20, eight full-height switch cards 850-1, . . . 850-8, and four full-height controller cards 880-1, . . . 880-4. The switch cards 850-1, . . . 850-8 are off-center with respect to the shelf so that the shelf can accommodate a maximum number of double-wide port cards 810-1, . . . 810-20 (i.e., six double-wide port cards to the left of the switch cards, and four double-wide port cards to the right of the switch cards). Although the shelf is shown with twenty port cards 810-1, . . . 810-20 and eight switch cards 850-1, . . . 850-8, this embodiment of the invention is not limited to such an arrangement, as the shelf can also have any number such as 24, 28, or 32, port cards, and any number, such as 2, 3, 4, 5, 6, or 7, switch cards. Twenty port cards 810-1, . . . 810-20 and eight switch cards 850-1, . . . 850-8 have been chosen only to illustrate the various aspects of the invention.

FIG. 8B illustrates the interconnections of the cards shown in FIG. 8A with the backplane PCB. In this example, there are four bidirectional connections from each of the twenty port cards 810-1, . . . , 810-20 to each of the eight switch cards 850-1, . . . , 850-8. A single bidirectional connection is implemented with four PCB traces (two differential pairs in each direction). (the above is Redundant) In certain embodiments, each link can transfer data at the rate of 6.25 Gbps, where 2.25 Gbps is link overhead information and 4 Gbps is actual payload data received from the line and/or client interfaces of the port cards 810-1, . . . 810-20.

Client and line interfaces on the port cards may be mounted on the front panels of the port cards. These interfaces may be in the form of pluggable optical devices or be optical connectors that then connect to optical devices internal to the port cards.

In the example shown in FIG. 8A, each port card 810-1, . . . 810-20 has thirty two links connecting it to the backplane, a total of 128 Gbps of payload data can be transferred from each port card slot to the collection of eight switch card slots. In certain embodiments, one of the switch cards in the shelf may be a redundant switch card for the remaining switch cards in the shelf. For example, one switch card may serve as a protection switch card for other switch cards. In a fault scenario (i.e., failure of one of the eight switch cards), seven switch cards may be capable of transporting the entire payload of the port cards. This results is a usable payload bandwidth of 112 Gbps per slot when switch protection is accounted for (7/8×128). Accordingly, each single-wide port card slot may accommodate a 100 Gbps port card.

In certain embodiments, 40 Gbps port cards and/or dual-wide 100 Gbps port cards may be employed. Since a dual-wide card occupies two slots, it has access to two set of 56 Gbps usable bandwidth backplane interfaces, providing for a total payload bandwidth of 112 Gbps.

Some embodiments may employ double-capacity port cards having dual 40 Gbps port cards and single-wide 100 Gbps port cards. Single-capacity port cards may also be mixed in with the double-capacity port cards. However, this may result in some stranded switch bandwidth on the switch cards.

In general, the shelves of FIG. 3A and FIG. 8A may utilize all the same port cards. The advantage of the shelf of FIG. 8A is that a system built using the shelf of FIG. 8A supports 20 port cards without incurring the cost of any parallel cables (and the associated optical-to-electrical and electrical-to-optical converters).

The switch cards 850-1 to 850-8 may contain a similar set of electrical connectors on their front panels, allowing a first shelf 800 to be interconnected to multiple second shelves using the same parallel cables used to connect the shelves shown in FIG. 7. For this case, a first shelf 800 may be connected to any combination of shelves 300 and 800 using identical parallel cables, thus creating larger systems than systems built by interconnecting only shelves of type 300 together.

Finally, further expansion of any system may be accomplished by interconnecting any number of shelves 300 and 800 to a centralized switch fabric using the same parallel cables to connect the switch cards in each switch shelf 300 and 800 to corresponding switch cards in the centralized switch fabric. Furthermore, an expansion from a standalone multi-shelf system to a larger system containing a centralized switch fabric can be accomplished in a hitless manner by moving one switch plane at a time to the central fabric (assuming the availability of a redundant switch plane).

Figure 9:
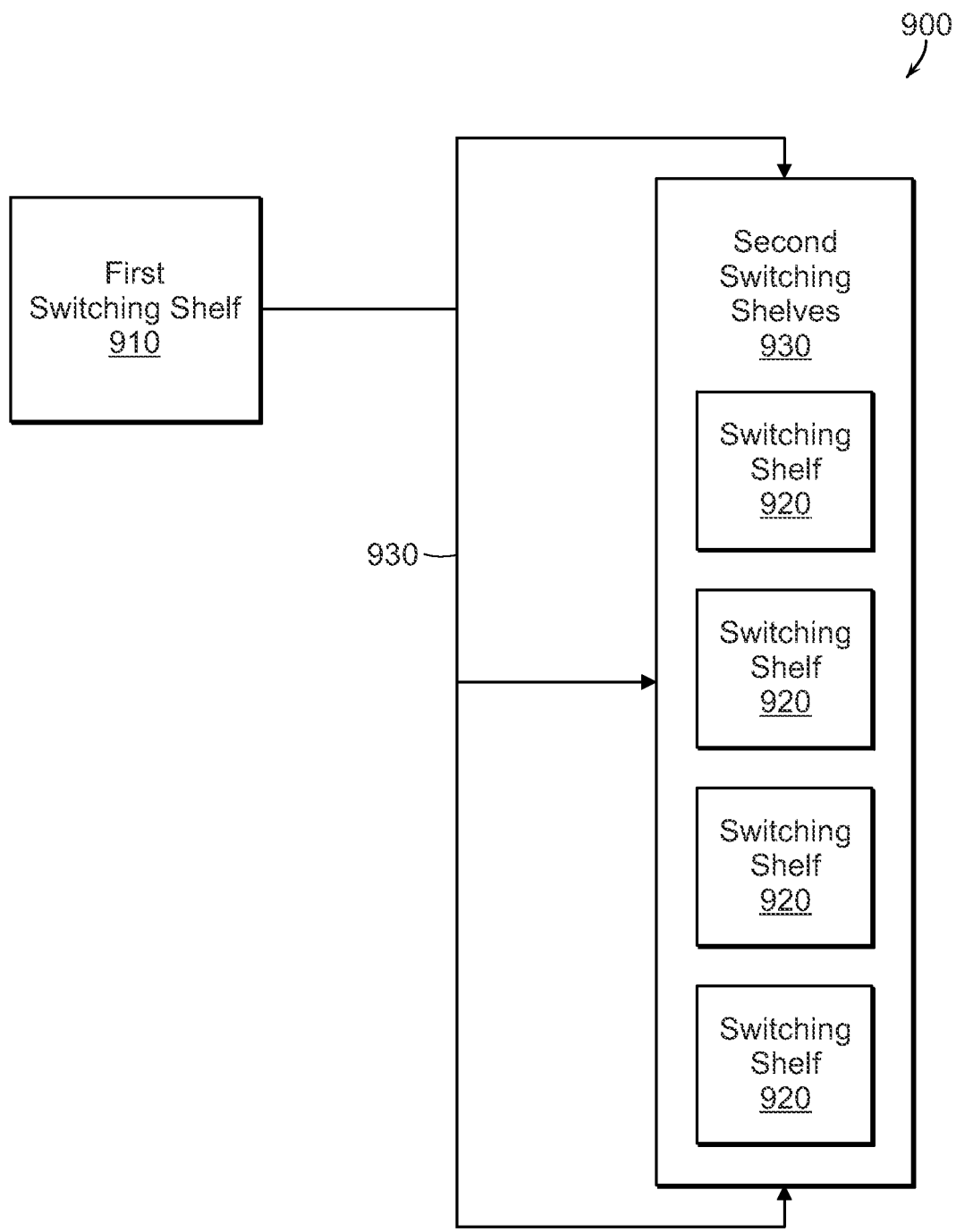
FIG. 9 is a high-level illustration of an example embodiment of the present invention.

FIG. 9 is a high-level illustration of an example embodiment 900 of the present invention. The example embodiment 900 includes a first switching shelf 910 having a first predetermined aggregate capacity, and multiple second switching shelves 920 having a second predetermined aggregate capacity. The first predetermined aggregate capacity is greater than the second predetermined aggregate capacity. The example embodiment 900 increases the overall aggregate capacity as a function of connecting (using connections 930) the first switching shelf to the multiple second switching shelves.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be loaded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a first physical switching shelf including a plurality of interconnected port cards having a first predetermined aggregate capacity for carrying data forwarded to a switching system and a plurality of switch cards having a second predetermined aggregate capacity for switching the data carried by the interconnected port cards, the second predetermined aggregate capacity being greater than the first predetermined aggregate capacity;
multiple second physical switching shelves, each second switching shelf including a plurality of interconnected port cards having a third predetermined aggregate capacity for carrying data forwarded to the switching system and a plurality of switch cards having a fourth predetermined aggregate capacity for switching the data carried by the interconnected port cards, the fourth predetermined aggregate capacity being greater than the third predetermined aggregate capacity, the third predetermined aggregate capacity being less than the first predetermined aggregate capacity, and the fourth predetermined aggregate capacity being less than the second predetermined aggregate capacity; and
a plurality of interconnecting links configurable to upgrade the switching system as a function of connecting the switch cards of the multiple second physical switching shelves to the switch cards of the first physical switching shelf.

2. The system of claim 1 further including one or more switching planes connected to the plurality of interconnected port cards, the switching planes switching the data carried by the interconnected port cards.

3. The system of claim 2, each switch card including at least one of the switching planes.

4. The system of claim 2 further including a redundant switching plane, the redundant switching plane serving as a protection switching plane for the one or more switching planes.

5. The system of claim 4 wherein the redundant switching plane is arranged to switch the data carried by the interconnected port cards in an event a switching plane of the one or more switching planes fails.

6. The system of claim 1 wherein each switching shelf includes one or more electrical connectors, the one or more electrical connectors being populated with cables converting data carried by the switching system between electrical and optical formats.

7. The system of claim 1 wherein the plurality of interconnection links are bidirectional links.

8. A method comprising:
interconnecting a first physical switching shelf to multiple second physical switching shelves via a plurality of interconnection links, the first physical switching shelf including a plurality of interconnected port cards having a first predetermined aggregate capacity for carrying data forwarded to a switching system and a plurality of switch cards having a second predetermined aggregate capacity for switching the data carried by the interconnected port cards, the second predetermined aggregate capacity being greater than the first predetermined aggregate capacity, each second switching shelf including a plurality of interconnected port cards having a third predetermined aggregate capacity for carrying data forwarded to the switching system and a plurality of switch cards having a fourth predetermined aggregate capacity for switching the data carried by the interconnected port cards, the fourth predetermined aggregate capacity being greater than the third predetermined aggregate capacity, the third predetermined aggregate capacity being less than the first predetermined aggregate capacity, and the fourth predetermined aggregate capacity being less than the second predetermined aggregate capacity; and upgrading the switching system as a function of the interconnection links connecting the switch cards of the multiple second switching shelves to the switch cards of the first physical switching shelf.

9. The method of claim 8 further including transmitting data forwarded to the switching system as a function of the plurality of interconnected port cards included in each switching shelf.

10. The method of claim 9 further including switching the data forwarded to the switching system as a function of one or more switching planes connected to the plurality of interconnected port cards.

11. The method of claim 10 wherein each switch card includes one or more of the switching planes.

12. The method of claim 10 further including grouping at least one of the switching planes into one or more of the switch cards.

13. The method of claim 10 further including providing a protection switching plane for the one or more switching planes as a function of employing a redundant switching plane.

14. The method of claim 13 further including switching the data to the protection switching plane in an event a switching plane of the one or more switching planes fails.

15. The method of claim 8 further including converting data carried by the switching system between electrical and optical formats as a function of employing one or more electrical connectors.

16. The method of claim 8 wherein the plurality of interconnection links are bidirectional links.

17. A system comprising:

a first physical switching shelf including a plurality of interconnected port cards having a first predetermined aggregate capacity for carrying data forwarded to a switching system and a plurality of switch cards having a second predetermined aggregate capacity for switching the data carried by the interconnected port cards, the second predetermined aggregate capacity being greater than the first predetermined aggregate capacity; and multiple second physical switching shelves, each second physical switching shelf including a plurality of interconnected port cards having a third predetermined aggregate capacity for carrying data forwarded to the switching system and a plurality of switch cards having a fourth predetermined aggregate capacity for switching the data carried by the interconnected port cards, the fourth predetermined aggregate capacity being greater than the third predetermined aggregate capacity, the third predetermined aggregate capacity being less than the first predetermined aggregate capacity, and the fourth predetermined aggregate capacity being less than the second predetermined aggregate capacity, each second physical switching shelf being connected to the first physical switching shelf as a function of a plurality of interconnecting links, each second physical switching shelf having one or more unpopulated connections.

18. The system of claim 17 further including one or more switching planes connected to the plurality of interconnected port cards, the switching planes switching the data carried by the interconnected port cards.

19. The system of claim 18, each switch card including at least one of the switching planes.

20. The system of claim 18 further including a redundant switching plane, the redundant switching plane serving as a protection switching plane for the one or more switching planes.

21. The system of claim 20 wherein the redundant switching plane is arranged to switch the data carried by the interconnected port cards in an event a switching plane of the one or more switching planes fails.

22. The system of claim 17 wherein each switching shelf includes one or more electrical connectors, the one or more electrical connectors being populated with cables converting data carried by the switching system between electrical and optical formats.

23. The system of claim 17 wherein the plurality of interconnecting links are bidirectional links.

* * * * *